United States Patent
Yang et al.

(10) Patent No.: US 9,250,438 B2
(45) Date of Patent: Feb. 2, 2016

(54) FREEFORM SURFACE REFLECTIVE SCANNING SYSTEM

(71) Applicants: Tsinghua University, Beijing (CN); HON HAI PRECISION INDUSTRY CO., LTD., New Taipei (TW)

(72) Inventors: Tong Yang, Beijing (CN); Jun Zhu, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/539,023

(22) Filed: Nov. 12, 2014

(65) Prior Publication Data
US 2015/0160453 A1 Jun. 11, 2015

(30) Foreign Application Priority Data
Dec. 11, 2013 (CN) .......................... 2013 1 0665525

(51) Int. Cl.
G02B 26/08 (2006.01)
G02B 26/10 (2006.01)

(52) U.S. Cl.
CPC ............ G02B 26/0816 (2013.01); G02B 26/10 (2013.01)

(58) Field of Classification Search
CPC .. G02B 26/0816; G02B 26/10; G02B 26/124; H01Q 19/10; H01Q 19/102; H01Q 19/12; H01Q 19/17; H01Q 19/175; H01Q 19/18; H01Q 19/19; H01Q 19/191; H01Q 19/192
USPC ........... 359/201.2, 208.2, 730, 856–858, 869; 343/836–837
See application file for complete search history.

(56) References Cited

U.S. PATENT DOCUMENTS

| | | | |
|---|---|---|---|
| 5,175,562 A * | 12/1992 | Rappaport | ........... H01Q 19/175 343/840 |
| 5,214,685 A * | 5/1993 | Howells | ................... G21K 1/06 359/846 |

* cited by examiner

*Primary Examiner* — James Phan
(74) *Attorney, Agent, or Firm* — Novak Druce Connolly Bove + Quigg LLP

(57) ABSTRACT

A freeform surface reflective scanning system includes a light source, an aperture, a first freeform surface mirror, and a second freeform surface mirror. The light source is configured to provide a laser. The first freeform surface mirror is located on an aperture side that is away from the light source. The first freeform surface mirror is configured to reflect the laser to form a first reflected light. The second freeform surface mirror is located on a first reflected light path. The second freeform surface mirror is configured to reflect the first reflected light to form a second reflected light. Both the first freeform surface mirror and the second freeform surface mirror are a fourth XY polynomial surface.

17 Claims, 6 Drawing Sheets

FREEFORM SURFACE REFLECTIVE SCANNING SYSTEM

CROSS-REFERENCE TO RELATED APPLICATIONS

This application claims all benefits accruing under 35 U.S.C. §119 from China Patent Application No. 201310665525.2, field on Dec. 11, 2013 in the China Intellectual Property Office, disclosure of which is incorporated herein by reference.

BACKGROUND

1. Technical Field

The present disclosure relates to a scanning system, and particularly to a freeform surface reflective scanning system.

2. Description of Related Art

Compared with conventional rotationally symmetric surfaces, freeform surfaces have more degrees of design freedom, which can reduce the aberrations and simplify the structure of the reflective scanning system.

However, the freeform surfaces are rarely used in conventional reflective scanning systems, because of their multi variables and high degrees. And, when the freeform surfaces are used in a scanning system, a volume, a weight and number of lenses of the reflective scanning systems should be considered. As such, it is difficult to design a freeform surface reflective scanning system with simple structure and superior imaging effect.

What is needed, therefore, is to provide a freeform surface reflective scanning system with simple structure, and superior imaging effect.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the freeform surface reflective scanning system.

DETAILED DESCRIPTION

The disclosure is illustrated by way of example and not by way of limitation in the figures of the accompanying drawings in which like references indicate similar elements. It should be noted that references to "one" embodiment in this disclosure are not necessarily to the same embodiment, and such references mean at least one.

Figure 1:
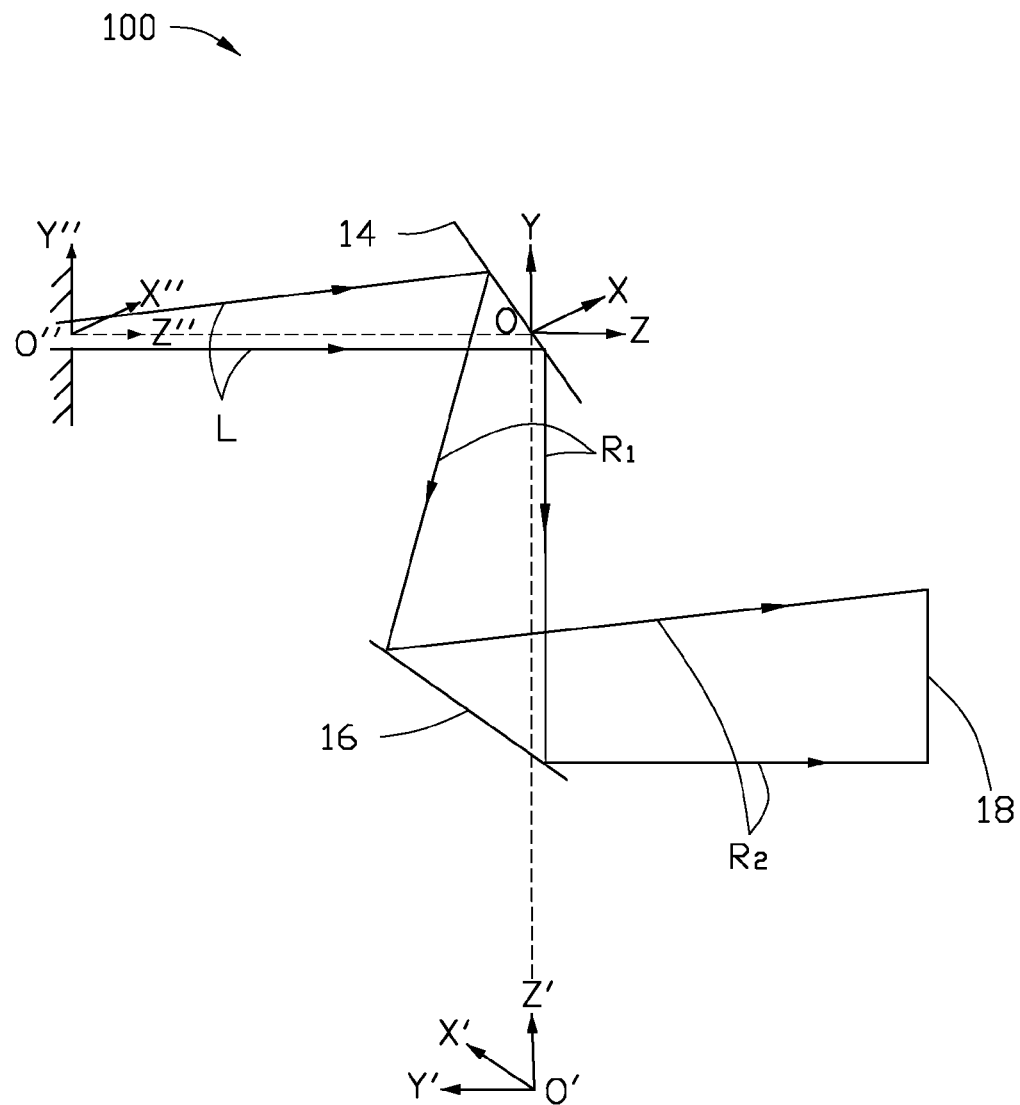
FIG. 1 is a schematic view of a freeform surface reflective scanning system according to one embodiment.

Referring to FIG. 1, a freeform surface reflective scanning system 100 of one embodiment is provided. The freeform surface reflective scanning system 100 includes a light source (not shown), an aperture 12, a first freeform surface mirror 14, and a second freeform surface mirror 16.

A first three-dimensional rectangular coordinates system (X,Y,Z) is defined by a first freeform surface mirror location. An aperture center is located on a first three-dimensional rectangular coordinates system (X,Y,Z) Z-axis. A second three-dimensional rectangular coordinates system (X',Y',Z') is defined by a second freeform surface mirror location. The second three-dimensional rectangular coordinates system (X',Y',Z') is obtained by rotating the first three-dimensional rectangular coordinates system (X,Y,Z) for about 90 degrees, in an anticlockwise direction, in a YZ plane, and a second three-dimensional rectangular coordinates system (X',Y',Z') origin O' is located on a first three-dimensional rectangular coordinates system (X,Y,Z) Y-axis.

The light source is used to provide a laser L. An angle is defined between the laser L and the first three-dimensional rectangular coordinates system (X,Y,Z) Z-axis. The angle is a field angle θ, which is in a range from about 0 degrees to about 8 degrees in one embodiment. A light source wavelength is not limited, in one embodiment, the light source wavelength is in a range from about 486 mm to about 656 mm.

The aperture 12 is located on a laser L emergent light path. The aperture 12 is used to control a laser L diameter. In one embodiment, an aperture optical hole is round, and a diameter of the aperture optical hole is about 6 mm. A distance between the aperture center and a first three-dimensional rectangular coordinates system (X,Y,Z) origin O is not limited. In one embodiment, the distance between the aperture center and the first three-dimensional rectangular coordinates system (X,Y,Z) origin O is about 113.328 mm.

The first freeform surface mirror 14 is located on an aperture side that is away from the light source. The first freeform surface mirror 14 is used to reflect the laser L to form a first reflected light $R_1$. In the first three-dimensional rectangular coordinates system (X,Y,Z), a first freeform surface mirror surface is a fourth order xy polynomial surface. In one embodiment, the first freeform surface mirror surface is a fourth order xy polynomial surface without odd items of x. An xy polynomial equation can be expressed as follows:

$$z(x,y) = \frac{c(x^2+y^2)}{1+\sqrt{1-(1+k)c^2(x^2+y^2)}} + A_2 y + A_3 x^2 + A_5 y^2 + A_7 x^2 y + A_9 y^3 + A_{10} x^4 + A_{12} x^2 y^2 + A_{14} y^4.$$

In the equation, c represents curvature, k represents conic constant, while $A_2 \sim A_{14}$ represent coefficients. In one embodiment, the values of c, k, and $A_2 \sim A_{14}$ in the equation of the first freeform surface mirror 14 are listed in TABLE 1. However, the values of c, k, and $A_2 \sim A_{14}$ in the equation of the first freeform surface mirror 14 are not limited to TABLE 1.

TABLE 1

| | |
|---|---|
| c | −0.0001639089267924 |
| k | −89680.0153613324000000 |
| $A_2$ | −4.3347368672E−01 |
| $A_3$ | −1.5456768240E−03 |
| $A_5$ | −1.4800190401E−03 |
| $A_7$ | −7.7232059803E−07 |
| $A_9$ | −3.1338086744E−06 |
| $A_{10}$ | −4.9598680747E−08 |
| $A_{12}$ | −9.0454185516E−08 |
| $A_{14}$ | 1.1558130145E−08 |

The second freeform surface mirror 16 is located on a first reflected light path.

The second freeform surface mirror 16 is used to reflect the first reflected light $R_1$ to form a second reflected light $R_2$. A distance between the first three-dimensional rectangular coordinates system (X',Y',Z') origin O and the second three-dimensional rectangular coordinates system (X,Y,Z) origin O' is not limited. In one embodiment, the distance between the origin O and the origin O' is about 336.649 mm.

In the second three-dimensional rectangular coordinates system (X',Y',Z'), a second freeform surface mirror surface is a fourth order x'y' polynomial surface. In one embodiment, the second freeform surface mirror surface is a fourth order x'y' polynomial surface without odd items of x'. An x'y' polynomial equation can be expressed as follows:

$$z(x', y') = \frac{c'(x'^2 + y'^2)}{1 + \sqrt{1-(1+k')c'^2(x'^2+y'^2)}} + A'_2 y' + A'_3 x'^2 + A'_5 y'^2 + A'_7 x'^2 y' + A'_9 y'^3 + A'_{10} x'^4 + A'_{12} x'^2 y'^2 + A'_{14} y'^4.$$

In the equation, c' represents curvature, k' represents conic constant, while $A'_2 \sim A'_{14}$ represent coefficients. In one embodiment, the values of c', k', and $A'_2 \sim A'_{14}$ in the equation of the second freeform surface mirror 16 are listed in TABLE 2. However, the values of c', k', and $A'_2 \sim A'_{14}$ in the equation of the second freeform surface mirror 16 are not limited to TABLE 2.

TABLE 2

| | |
|---|---|
| c' | −0.0008571713 |
| k' | 172.6455709912 |
| $A_2'$ | 4.7263558821E+00 |
| $A_3'$ | −3.0701897133E−04 |
| $A_5'$ | 5.8773994610E−03 |
| $A_7'$ | −7.7993642472E−05 |
| $A_9'$ | −4.3316165003E−04 |
| $A_{10}'$ | −3.8626929695E−07 |
| $A_{12}'$ | 5.9894280608E−07 |
| $A_{14}'$ | 2.4394567833E−06 |

An image surface 18 is formed on a second reflected light path. The image surface 18 is substantially parallel to a first three-dimensional rectangular coordinates system (X,Y,Z) XY plane. A distance between the image surface 18 and the aperture center along the first three-dimensional rectangular coordinates system (X,Y,Z) Z-axis is about 180 mm.

In the first three-dimensional rectangular coordinates system (X,Y,Z), a first freeform surface mirror actual use range is −3 mm≤x≤3 mm, and −3 mm≤y≤17.77337 mm. In the second three-dimensional rectangular coordinates system (X',Y',Z'), a second freeform surface mirror actual use range is −1.35205 mm≤x'≤1.35205 mm, and 67.95944 mm≤y'≤78.21945 mm.

Figure 2:
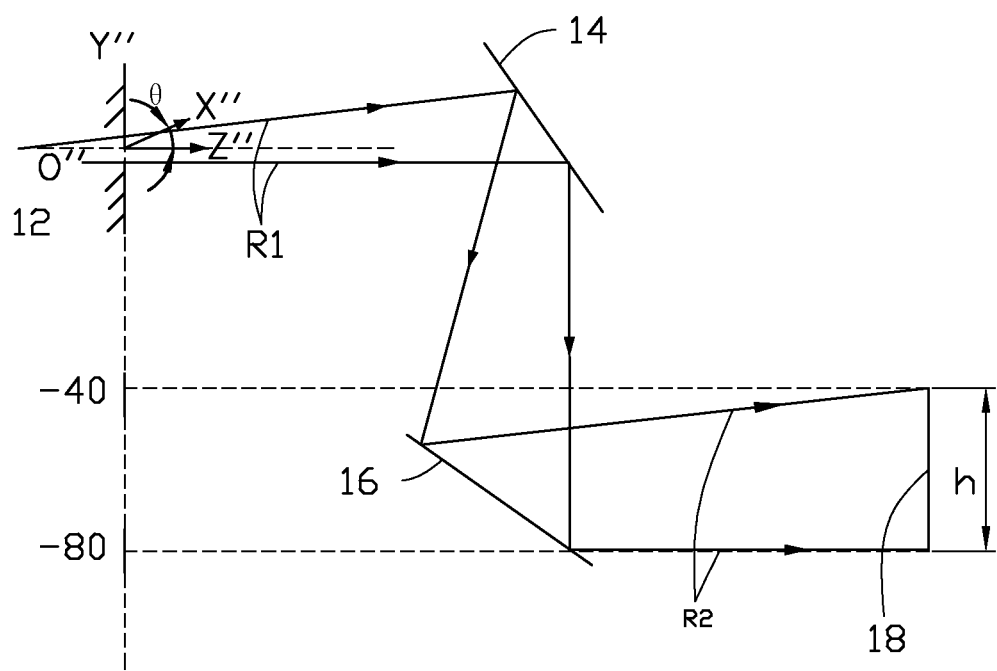
FIG. 2 is a schematic view of a scanning range of the freeform surface reflective scanning system in FIG. 1.
Figure 3:
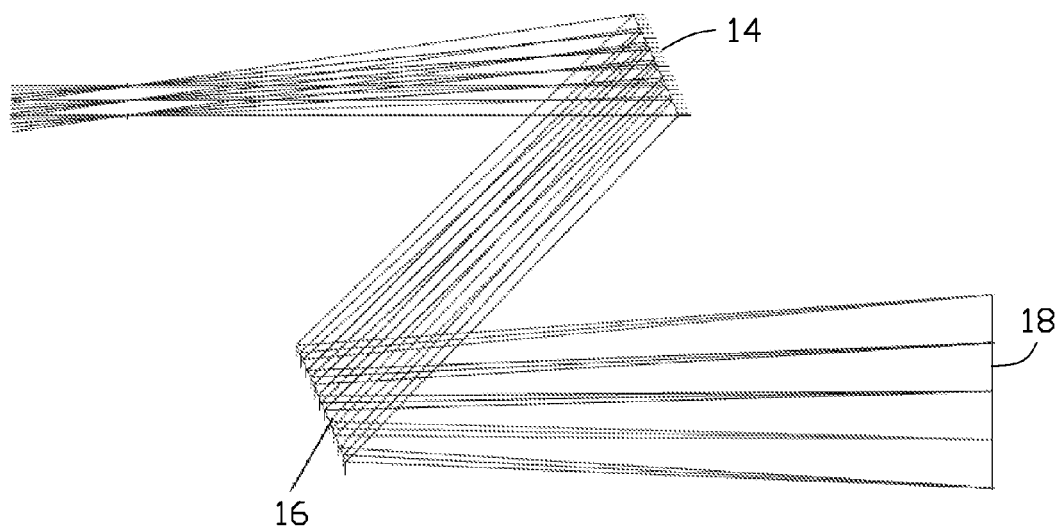
FIG. 3 is a schematic view of an light path of the freeform surface reflective scanning system in FIG. 1.

A third three-dimensional rectangular coordinates system (X",Y",Z") is defined by an aperture location, the aperture center is an origin O". In the third three-dimensional rectangular coordinates system (X",Y",Z"), the image surface coordinates on a Y"-axis is a scanning image high h. A relationship between the scanning image high h and the field angle θ is h(mm)=−80+5θ, wherein an unit of θ is degree. Referring to FIGS. 2 and 3, in one embodiment, the field angle θ is in a range from about 0 degrees to about 8 degrees, corresponding to linear sweep from about −80 mm to about −40 mm on the image surface 18. In other words, a freeform surface reflective scanning system effective scanning range is about 40 mm.

Figure 4:
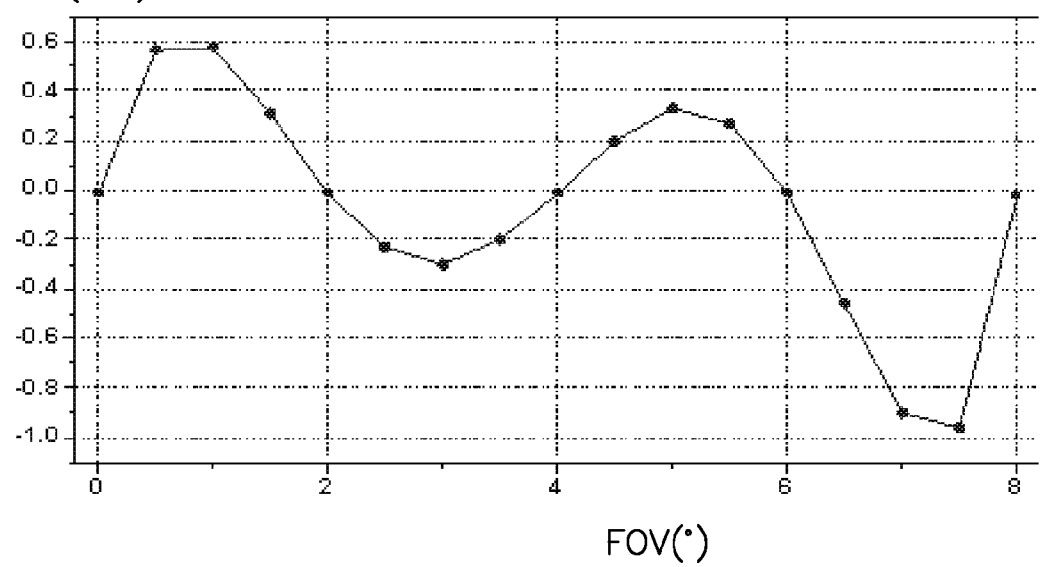
FIG. 4 is a diagram showing a scanning error of the freeform surface reflective scanning system in FIG. 1.

Referring to FIG. 4, each field scanning error on the image surface 18 is less than ±1 μm. It shows that the freeform surface reflective scanning system 100 can control each field light direction, and have good scanning linearity.

Figure 5:
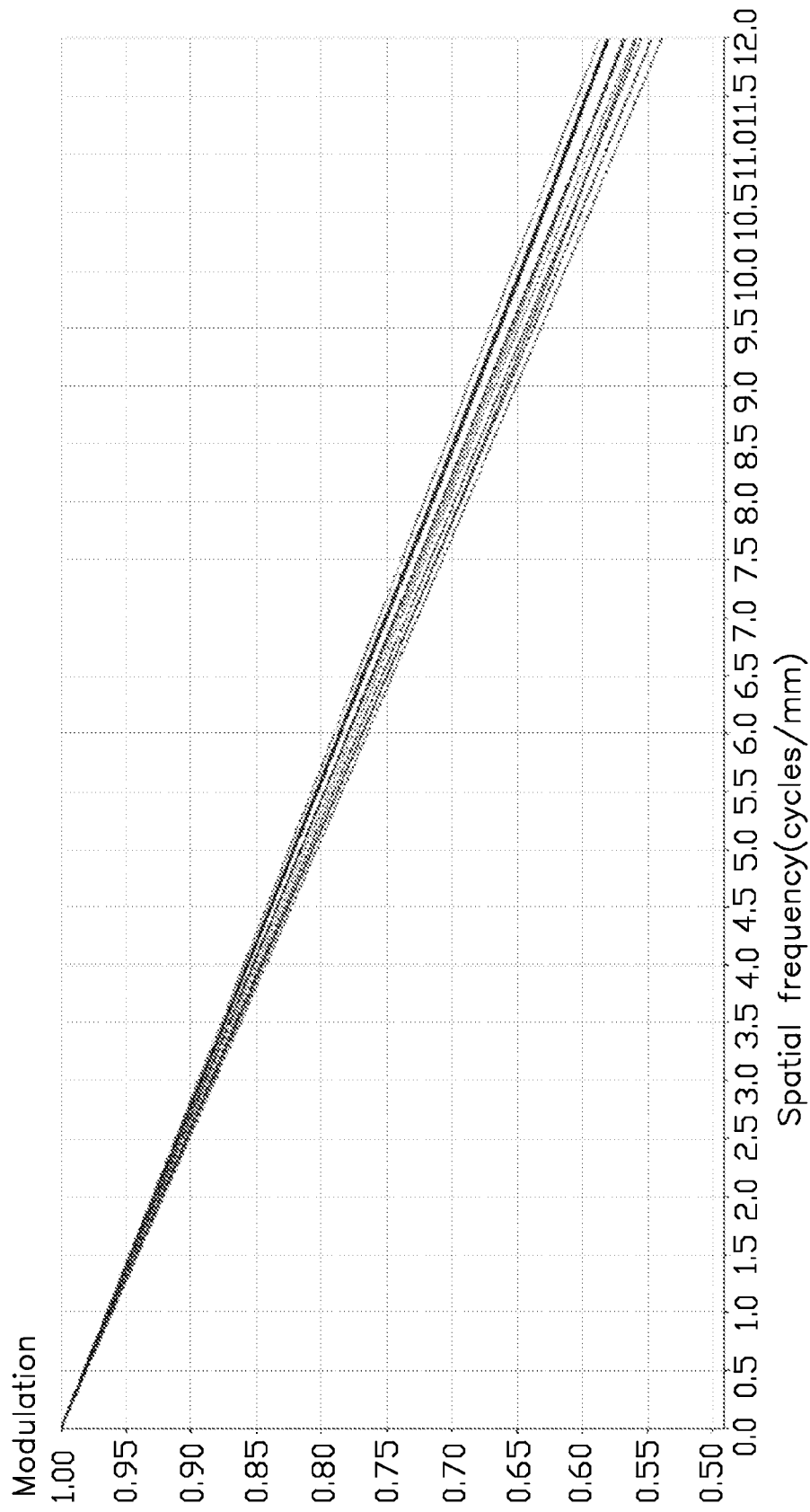
FIG. 5 is a graph showing modulation transfer function curves of partial field angles of the freeform surface reflective scanning system in FIG. 1.

Plots of modulation transfer function (MTF) of the freeform surface reflective scanning system 100 are shown in FIG. 5. The freeform surface reflective scanning system modulation transfer function is close to the diffraction limit.

Figure 6:
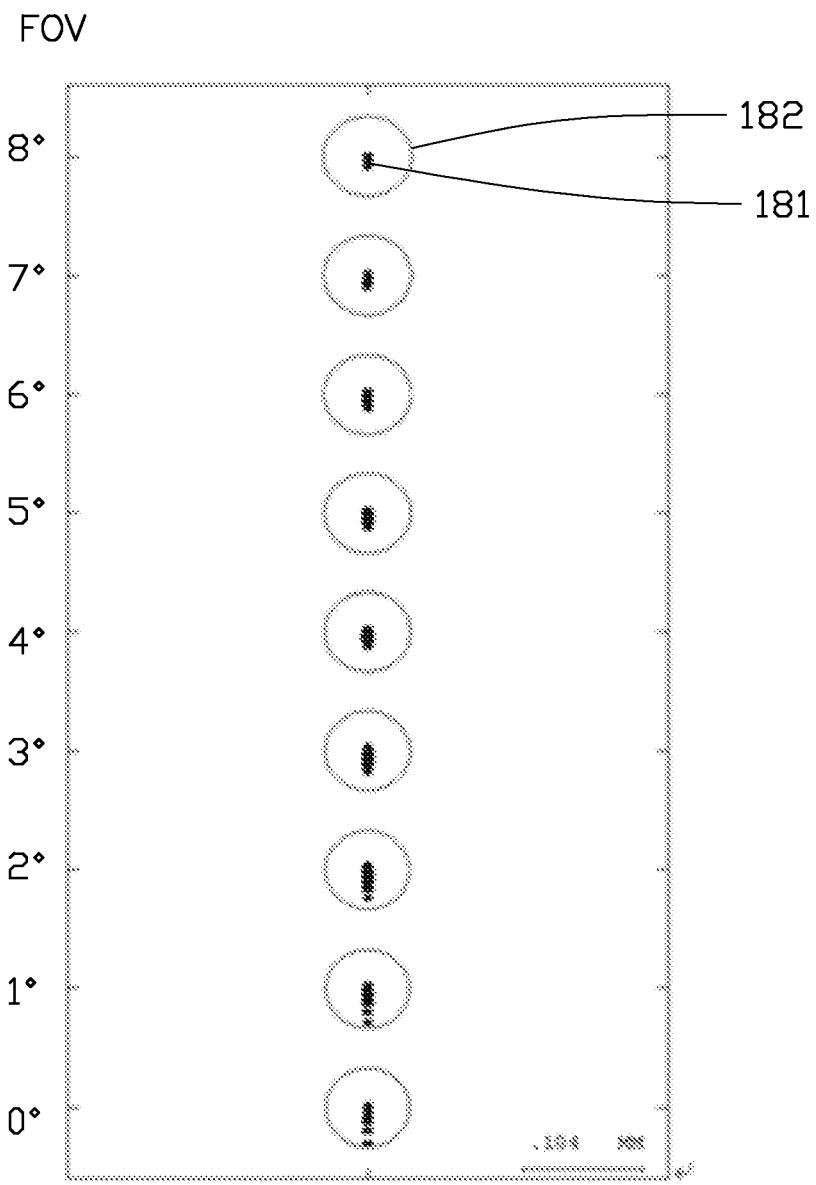
FIG. 6 is a schematic view showing spots row in a visible field of the freeform surface reflective scanning system in FIG. 1.

Referring to FIG. 6, all the defocused spots 181 of each field are in the airy spots 182. It shows that a freeform surface reflective scanning system imaging quality is well.

The freeform surface reflective scanning system 100 can be used in laser printers, scanners, etc.

The above-described contents are detailed illustrations with specific and preferred embodiments for the present disclosure. It cannot be considered that the implementation of the present disclosure is limited to these illustrations. For one of ordinary skill in the art, variations and equivalents having the same effects and applications can be made without departing from the spirit of the present disclosure and should be seen as being belonged to the scope of the present disclosure.

What is claimed is:

1. A freeform surface reflective scanning system comprising:
a light source configured to provide a laser;
an aperture located on a laser light path;
a first freeform surface mirror located on an aperture side that is away from the light source, and configured to reflect the laser to form a first reflected light;
a second freeform surface mirror located on a first reflected light path, and configured to reflect the first reflected light to form a second reflected light;
wherein a first three-dimensional rectangular coordinates system (X,Y,Z) is defined by a first freeform surface mirror location, an aperture center is located on a Z-axis; a second three-dimensional rectangular coordinates system (X',Y',Z') is defined by a second freeform surface mirror location, the second three-dimensional rectangular coordinates system (X',Y',Z') is obtained by rotating the first three-dimensional rectangular coordinates system (X,Y,Z) for about 90 degrees, in an anticlockwise direction, in a YZ plane, and a second three-dimensional rectangular coordinates system (X',Y',Z') origin is located on a Y-axis, a first freeform surface mirror surface is a fourth order xy polynomial surface, and a second freeform surface mirror surface is a fourth order x'y' polynomial surface.

2. The system as claimed in claim 1, wherein a fourth order xy polynomial surface equation is $$z(x, y) = \frac{c(x^2 + y^2)}{1 + \sqrt{1-(1+k)c^2(x^2+y^2)}} + A_2 y + A_3 x^2 + A_5 y^2 + A_7 x^2 y + A_9 y^3 + A_{10} x^4 + A_{12} x^2 y^2 + A_{14} y^4,$$

wherein, c represents curvature, k represents conic constant, and $A_2 \sim A_{14}$ represent coefficients.

3. The system as claimed in claim 2, wherein c=−0.0001639089267924, k=−89680.0153613324000000, $A_2$=−4.3347368672E−01, $A_3$=−1.5456768240E−03, $A_5$=−1.4800190401E−03, $A_7$=−7.7232059803E−07, $A_9$=−3.1338086744E−06, $A_{10}$=−4.9598680747E−08, $A_{12}$=−9.0454185516E−08, and $A_{14}$=1.1558130145E−08.

4. The system as claimed in claim 1, wherein a fourth order x'y' polynomial surface equation is $$z(x', y') = \frac{c'(x'^2 + y'^2)}{1 + \sqrt{1 - (1+k')c'^2(x'^2 + y'^2)}} + A_2'y' + A_3'x'^2 + A_5'y'^2 + A_7'x'^2y' + A_9'y'^3 + A_{10}'x'^4 + A_{12}'x'^2y'^2 + A_{14}'y'^4,$$

wherein, c' represents curvature, k' represents conic constant, and $A_2' \sim A_{14}'$ represent coefficients.

5. The system as claimed in claim 4, wherein c'=−0.0008571713, k'=172.6455709912, $A_2'$=4.7263558821E+00, $A_3'$=−3.0701897133E−04, $A_5'$=5.8773994610E−03, $A_7'$=−7.7993642472E−05, $A_9'$=−4.3316165003E−04, $A_{10}'$=−3.8626929695E−07, $A_{12}'$=5.9894280608E−07, and $A_{14}'$=2.4394567833E−06.

6. The system as claimed in claim 1, wherein a distance between the aperture center and a first three-dimensional rectangular coordinates system (X,Y,Z) origin is about 113.328 mm.

7. The system as claimed in claim 1, wherein a distance between the first three-dimensional rectangular coordinates system (X,Y,Z) origin, and the second three-dimensional rectangular coordinates system (X',Y',Z') origin is about 336.649 mm.

8. The system as claimed in claim 1, wherein an image surface is formed on a second reflected light path, and a distance between the image surface and the aperture center along the Z-axis is about 180 mm.

9. The system as claimed in claim 8, wherein an angle between the laser and the Z-axis is defined as a field angle θ, and the field angle θ is ranged from about 0 degrees to about 8 degrees.

10. The system as claimed in claim 9, wherein a third three-dimensional rectangular coordinates system (X",Y",Z") is defined by an aperture location; the aperture center is an origin; in the third three-dimensional rectangular coordinates system (X",Y",Z"), the image surface coordinates on a Y"-axis is defined as a scanning image high h; and a relationship between the scanning image high h and the field angle θ is h(mm)=−80+5θ.

11. The system as claimed in claim 1, wherein a light source wavelength is in a range from about 486 mm to about 656 mm.

12. The system as claimed in claim 1, wherein an aperture optical hole is round, and a diameter of the aperture optical hole is about 6 mm.

13. The system as claimed in claim 1, wherein in the first three-dimensional rectangular coordinates system (X,Y,Z), a first freeform surface mirror actual use range is −3 mm≤x≤3 mm, and −3 mm≤y≤17.77337 mm.

14. The system as claimed in claim 1, wherein in the second three-dimensional rectangular coordinates system (X',Y',Z'), a second freeform surface mirror actual use range is −1.35205 mm≤x'≤1.35205 mm, and 67.95944 mm≤y'≤78.21945 mm.

15. The system as claimed in claim 1, wherein each freeform surface reflective scanning system field scanning error on an image surface is less than ±1 μm.

16. The system as claimed in claim 1, wherein a freeform surface reflective scanning system effective scanning range is about 40 mm.

17. A freeform surface reflective scanning system comprising:
a light source, configured to provide a laser;
an aperture, located on a laser light path;
a first freeform surface mirror, located on an aperture side that is away from the light source, and configured to reflect the laser to form a first reflected light;
a second freeform surface mirror, located on a first reflected light path, and configured to reflect the first reflected light to form a second reflected light; and
an image surface formed on a second reflected light path;
wherein a first freeform surface mirror surface and a second freeform surface mirror surface are both a fourth order polynomial surface.

* * * * *